(12) United States Patent
Yang et al.

(10) Patent No.: US 7,251,660 B2
(45) Date of Patent: Jul. 31, 2007

(54) PROVIDING MAPPINGS BETWEEN LOGICAL TIME VALUES AND REAL TIME VALUES IN A MULTINODE SYSTEM

(75) Inventors: Wanli Yang, San Mateo, CA (US); Bipul Sinha, Foster City, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 596 days.

(21) Appl. No.: 10/866,234

(22) Filed: Jun. 10, 2004

(65) Prior Publication Data

US 2005/0278359 A1 Dec. 15, 2005

(51) Int. Cl.
*G06F 17/00* (2006.01)
*G06F 7/00* (2006.01)
(52) U.S. Cl. ...................... 707/100; 707/201
(58) Field of Classification Search .......... 707/3–5, 707/100–102, 201–205; 709/203; 711/5, 711/102–104, 147, 200
See application file for complete search history.

(56) References Cited

U.S. PATENT DOCUMENTS

| | | | |
|---|---|---|---|
| 5,280,612 A | 1/1994 | Lorie et al. | |
| 5,317,731 A | 5/1994 | Dias et al. | |
| 5,347,653 A | 9/1994 | Flynn et al. | |
| 5,440,730 A | 8/1995 | Elmasri et al. | |
| 5,546,558 A | 8/1996 | Jacobson et al. | 711/114 |
| 5,638,508 A | 6/1997 | Kanai et al. | |
| 5,680,570 A | 10/1997 | Rantala et al. | 711/113 |
| 5,701,480 A | 12/1997 | Raz | |
| 5,724,581 A | 3/1998 | Kozakura | 707/202 |
| 5,787,445 A | 7/1998 | Daberko | 707/205 |

(Continued)

FOREIGN PATENT DOCUMENTS

FR 2 746 526 A1 9/1997

OTHER PUBLICATIONS

Chandrasekaran, Sirish, "PSoup: a system for streaming queries over streaming data" (2003) vol. 12, Issue 2, pp. 140-156.

(Continued)

*Primary Examiner*—Chong H. Kim
*Assistant Examiner*—Susan Rayyan
(74) *Attorney, Agent, or Firm*—Hickman Palermo Truong & Becker LLP

(57) ABSTRACT

Techniques are provided for providing mappings between logical time values and real time values in a multinode system. The techniques include, if a first event occurs, then writing an LTV-to-RTV mapping to a non-volatile data structure. If a second event occurs, then a check is performed to determine whether any of the LTV-to-RTV mappings in the volatile data structure are newer than all LTV-to-RTV mappings in a non-volatile data structure. If there are newer mappings in the volatile data structure, then one or more LTV-to-RTV mappings are written to the non-volatile data structure based on those "newer" LTV-to-RTV mappings from the volatile data structure. Upon receiving a request an LTV for a particular RTV, the particular RTV is determined based on information from an information source such as the volatile data structure or the non-volatile data structure.

60 Claims, 7 Drawing Sheets

U.S. PATENT DOCUMENTS

| | | | |
|---|---|---|---|
| 5,845,313 A | 12/1998 | Estakhri et al. | 711/103 |
| 5,857,204 A | 1/1999 | Lordi et al. | |
| 5,873,102 A | 2/1999 | Bridge, Jr. et al. | |
| 5,890,167 A | 3/1999 | Bridge, Jr. et al. | |
| 5,907,848 A | 5/1999 | Zaiken et al. | |
| 5,930,794 A | 7/1999 | Linenbach et al. | |
| 5,940,850 A | 8/1999 | Harish et al. | 711/102 |
| 5,956,731 A | 9/1999 | Bamford et al. | |
| 5,974,427 A | 10/1999 | Reiter | |
| 6,012,059 A | 1/2000 | Neimat et al. | |
| 6,012,060 A | 1/2000 | Loaiza et al. | |
| 6,014,674 A | 1/2000 | McCargar | |
| 6,018,746 A | 1/2000 | Hill et al. | |
| 6,029,160 A | 2/2000 | Cabrera et al. | |
| 6,067,550 A | 5/2000 | Lomet | |
| 6,138,121 A | 10/2000 | Costa et al. | |
| 6,148,377 A | 11/2000 | Carter et al. | 711/147 |
| 6,173,292 B1 | 1/2001 | Barber et al. | |
| 6,182,241 B1 | 1/2001 | Ngai et al. | |
| 6,192,377 B1 | 2/2001 | Ganesh et al. | |
| 6,192,378 B1 | 2/2001 | Abrams et al. | |
| 6,237,001 B1 | 5/2001 | Bamford et al. | |
| 6,243,702 B1 | 6/2001 | Bamford et al. | |
| 6,263,338 B1 | 7/2001 | Ronström et al. | |
| 6,321,234 B1 | 11/2001 | Debrunner et al. | |
| 6,449,624 B1 | 9/2002 | Hammack et al. | |
| 6,480,847 B1 | 11/2002 | Linenbach et al. | |
| 6,502,133 B1 | 12/2002 | Baulier et al. | |
| 6,505,228 B1 | 1/2003 | Schoening et al. | |
| 6,567,928 B1 | 5/2003 | Lyle et al. | |
| 6,609,123 B1 | 8/2003 | Cazemier et al. | |
| 6,618,822 B1 | 9/2003 | Loaiza et al. | |
| 6,631,374 B1 | 10/2003 | Klein et al. | |
| 6,636,851 B1 | 10/2003 | Bamford et al. | |
| 6,647,473 B1 | 11/2003 | Golds et al. | 711/161 |
| 6,647,510 B1 | 11/2003 | Ganesh et al. | |
| 6,681,230 B1 | 1/2004 | Blott et al. | |
| 6,735,605 B2 | 5/2004 | Bird et al. | |
| 6,738,975 B1 | 5/2004 | Yee et al. | |
| 6,769,074 B2 | 7/2004 | Vaitzblit | |
| 6,769,124 B1 | 7/2004 | Schoening et al. | |
| 2002/0116457 A1 | 8/2002 | Eshleman et al. | 709/203 |
| 2005/0055385 A1 | 3/2005 | Sinha et al. | 707/203 |
| 2005/0055603 A1 | 3/2005 | Soran et al. | 714/7 |
| 2005/0144199 A2* | 6/2005 | Hayden | 707/204 |
| 2005/0256897 A1* | 11/2005 | Sinha et al. | 707/102 |
| 2005/0278350 A1* | 12/2005 | Yang et al. | 707/100 |

OTHER PUBLICATIONS

Djafri, Nassima et al., "Spatio-temporal evolution: querying patterns of change in databases" (2002) ACM Press, pp. 35-41.

Sandra Cheevers, Oracle Corporation, "Oracle9*i* Database Summary," An Oracle White Paper, May 2002, pp. 1-35.

Ron Weiss, Oracle Corporation, "Oracle9*i* Availability and Manageability Technology," Feb. 13, 2001, pp. 1-39.

Ron Weiss, Oracle Corporation, "Oracle High Availability Architectural Overview," Feb. 12, 2001, pp. 1-37.

Oracle Corporation, "Oracle9*i* Flashback Query," Oracle9*i* Database, Daily Feature, Apr. 18, 2002, pp. 1-2.

Oracle Corporation, "Flashback Technology," 2004, pp. 1-5.

Chiang Lee et al, "Temporal Grid File: A File Structure for Interval Data," Data & Knowledge Engineering, vol. 26, No. 1, May 1998, XP-001004414, pp. 71-97.

Toshiyuki Amagasa et al, "Implementing Time-Interval Class for Managin Temporal Data," International Workshop on Database and Expert Systems Applications, Aug. 26, 2003, XP-002167975, 7 pages.

* cited by examiner

FIG. 2A

| First Mapping Table 200 ||
|---|---|
| Logical Time Value Column 210 | Real Time Value Column 220 |
|  |  |
|  |  |
|  |  |

FIG. 2B

| Second Mapping Table 240 ||||||
|---|---|---|---|---|---|
| Start Logical Time Value Column 242 | Start Real Time Value Column 244 | End Logical Time Value Column 246 | End Real Time Value Column 248 | Length Column 250 | Data Column 252 |
|  |  |  |  |  |  |
|  |  |  |  |  |  |

PROVIDING MAPPINGS BETWEEN LOGICAL TIME VALUES AND REAL TIME VALUES IN A MULTINODE SYSTEM

RELATED APPLICATIONS

This application is related to U.S. patent application Ser. No. 10/325,211, entitled "METHOD AND APPARATUS FOR ACCESSING DATA AS IT EXISTED AT A PREVIOUS POINT IN TIME", filed Dec. 18, 2002, naming Sinha et al. as inventors, which is hereby incorporated by reference for all purposes as if fully set forth herein (referred to herein as '211).

This application is also related to U.S. patent application Ser. No. 10/856,569, entitled, "PROVIDING MAPPINGS BETWEEN LOGICAL TIME VALUES AND REAL TIME VALUES", filed May 27, 2004, naming Yang et al. as inventors, which is hereby incorporated by reference for all purposes as if fully set forth herein (referred to herein as '569).

FIELD OF THE INVENTION

The present invention relates to mapping between time and system events. The invention more specifically relates to providing mappings between logical time values (LTV) and real time values (RTV) in a multinode system.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A query performed on a database allows the retrieval of specific information based on the data currently in the database. Some database systems provide data to a query based on a particular "snapshot" of the database, where the snapshot corresponds to a particular time value of the logical clock used by the database server. That is, one may be able to query a database and receive results "as of" a particular logical time, thereby receiving data that reflects only those changes that were committed as of the logical time.

In one approach, implemented as part of Oracle 9i, which was released on DAY MONTH of 200X, each of multiple database servers has access to a database. LTV-to-RTV mappings are stored for each of the multiple database servers, and those mappings are tagged with the database server's identification number. When a particular database server receives a request for information as of a particular RTV, then the particular database server attempts to determine an LTV for the particular RTV based on the mappings that are tagged with the server's instance identification number. A first problem with this approach is that the results are non-deterministic. The resulting LTV value is likely to be different depending on at which database server the query arrives. A second problem with this approach is that, if the database server that receives the request for the LTV for the particular RTV had not yet been started at the time of the particular RTV, then there will be no appropriate LTV-to-RTV mapping information stored for the particular database server, and therefore, the request could not be satisfied.

Based on the foregoing, there is a clear need for techniques that provide mappings between logical time values and real time values in a manner that overcomes the problems described herein.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is an illustration of a first mapping table for storing LTV-to-RTV mappings.

FIG. 2B is an illustration of a second mapping table for storing LTV-to-RTV mappings.

DETAILED DESCRIPTION OF THE INVENTION

Techniques for providing mappings between logical time values and real time values are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Introduction

Techniques for providing mappings between LTVs and RTVs in a multinode system are described herein. The system may include multiple database servers each with access to the same database. Each database server records an LTV-to-RTV mapping for a set of one or more database events (such as writes to the database). Each database server has its own local table of LTV-to-RTV mappings. At each database server, upon the occurrence of a "second event" (such as a log writer unit waking up), the database server writes values from its local table of mappings to a table of mappings that is shared by all of the database servers. Only those LTV-to-RTV mappings in the local table that are newer than all of the mappings in the shared table are written to the shared table. In some embodiments, a check is performed before writing data from the local table to the shared table to determine whether the local table is "full". If the local table is not full, no entries are written to the shared table and a message is sent to other database servers indicating that they should write their tables of local mappings to the shared table. This may prevent gaps in the sequence of mappings in the shared table. In some embodiments, each local table is a data structure stored in volatile memory and the shared table is a data structure stored on disk.

When a request for an LTV for a particular RTV is received (e.g. as part of processing an "as of" query), then the local table of LTV-to-RTV mappings and, optionally, a local cache of recently-used LTV-to-RTV mappings are checked to determine whether the LTV can be determined from the local table or cache. If possible, the RTV is determined from the local cache or table. If the LTV cannot be determined from the local cache or local table, then the RTV is determined from the shared table, if possible. If the LTV-to-RTV mapping cannot be determined from any of these sources, then an error may be reported to an appropriate entity. If the mappings can be determined from one of the local or shared sources, then the LTV-to-RTV mapping is determined and provided to the entity that requested it and, optionally, the mapping may be written to the local cache of recently used mappings at the database server that handled the request.

Structural Overview

Figure 1A:
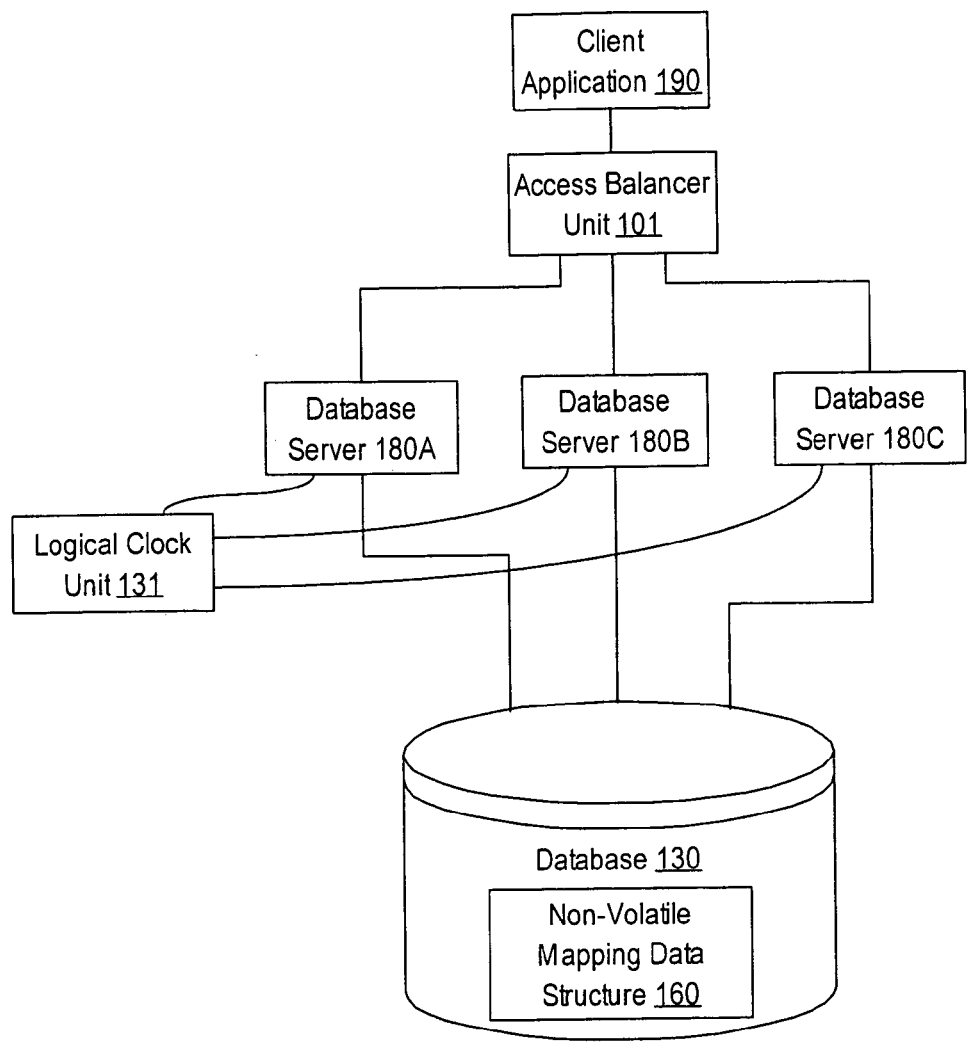
FIG. 1A is a block diagram depicting a multinode system for providing mappings between logical time values and real time values.

FIG. 1A is a block diagram depicting a multinode system for providing mappings between logical time values and real time values.

The access balancer unit 101 is communicatively coupled to the client application 190 and database servers 180A, 180B, and 180C. Each of the database servers 180A, 180B, and 180C are communicatively coupled to the logical clock unit 131 and the database 130. The database 130 includes a non-volatile mapping data structure 160. In various embodiments, the coupling is accomplished by optical, infrared, or radio signal transmission, direct cabling, wireless networking, local area networks (LANs), wireless local area networks (WLANs), wide area network (WANs), the Internet, or any appropriate communication mechanism.

Each of the client application 190, access balancer unit 101, the database servers 180A, 180B, and 180C, the logical clock unit 131, and the database 130 is a logical machine. Each logical machine may be a process or set of processes running on a single physical machine or may be one or more processes running on a separate physical machine from the other physical machines. Each logical machine may also include one or more processes running on each of multiple physical machines. Various embodiments of computers and other physical and logical machines are described in detail below in the section entitled Hardware Overview.

The client application 190 may be any application that enables a human end user or a machine to access or manipulate data in a database 130. The client application may be a database application 190. Example database applications include command-line database interfaces and software applications that access or manipulate data in a database 130.

The access balancer unit 101 is a logical machine that provides one or more client applications access to database 130 through two or more database servers 180A, 180B, and 180C. The techniques described herein are not limited to any particular access-balancing scheme. Example balancing schemes include round-robin balancing, where each subsequent client application or each subsequent request from a client application 190 is sent to a different database server 180A, 180B, and 180C. Other balancing schemes may be based on relative processing loads on the database servers 180A, 180B, and 180C.

The database servers 180A, 180B, and 180C provide access to the database. The components of a database server 180 are described below with respect to FIG. 1B.

The logical clock unit 131 may include logic to determine any appropriate logical clock value related to events in the database server 180A, 180B, and 180C or events related to the database 130. In one embodiment, the logical clock unit 131 includes logic to assign logical time values that indicate the sequence of events, such as database commits, within the database 130. In a related embodiment, this is called a "system count number".

The database 130 may be any appropriate relational database, object-oriented database, or other structured data. In the example used herein, the database 130 includes the non-volatile mapping data structure 160. The non-volatile mapping data structure 160 stores LTV-to-RTV mappings and may include either of the example data structures depicted in FIG. 2A or FIG. 2B.

Figure 1B:
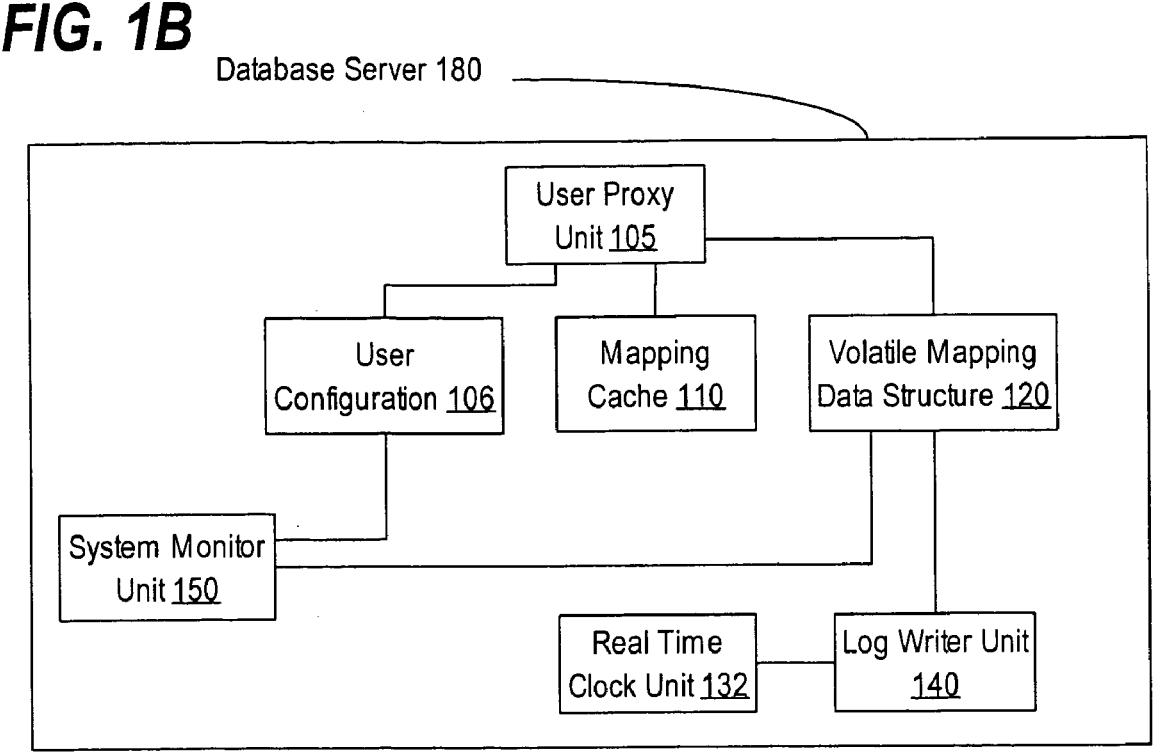
FIG. 1B is a block diagram depicting components of a database server.

FIG. 1B is a block diagram depicting components of a database server 180. Though the components and actions of the components are described for a representative database server 180, the database servers 180A, 180B, and 180C may each include the components described and the components of the database servers 180A, 180B, and 180C may each perform the actions described for the components of representative database server 180. Unless otherwise indicated herein, the components in FIG. 1B are referred to in subsequent examples and illustrations as if they are components of database server 180A from FIG. 1A.

The database server 180 comprises a user proxy unit 105, a user configuration 106, a mapping cache 110, a volatile mapping data structure 120, a real time clock unit 132, a log writer unit 140, and a system monitoring unit 150. In various embodiments, the database server 180 is a single process running on a single physical machine or multiple processes running on one or more physical machines. Each of the user proxy unit 105, the real time clock unit 132, the log writer unit 140, and the system monitoring unit 150 is a logical machine. Various embodiments of logical machines are described above.

In general, any of the components of the database server 180 may be communicatively coupled to any of the other components in the database server 180. In this specific example, the user proxy unit 105 is communicatively coupled to the user configuration 106, mapping cache 110, and volatile mapping data structure 120. The log writer unit 140 is communicatively coupled to the volatile mapping data structure 120 and the real time clock unit 132. The system monitoring unit 150 is communicatively coupled to the volatile mapping data structure 120, and the user configuration 106. Various embodiments of coupling are described above.

The user proxy unit 105 may comprise mechanisms for receiving or obtaining queries from database users or client applications 190 or may comprise mechanisms for receiving requests for LTV-to-RTV mappings. The user proxy unit 105 may also include logic for determining if an LTV-to-RTV mapping can be determined from any of the mapping cache 110, volatile mapping data structure 120, or non-volatile mapping data structure 160.

The user configuration 106 may include one or more flat files, one or more database tables, or any appropriate storage mechanism stored on a machine-readable medium. Each of the mapping cache 110 and the volatile mapping data structure 120 may include a two-column table of LTVs and corresponding RTVs (similar to the table depicted in FIG. 2A) stored in memory or on another machine-readable medium. Alternatively, the mapping cache 110 or the volatile mapping data structure 120 may be any appropriate storage of LTV-to-RTV mappings, including a data structure similar to that depicted in FIG. 2B. It may be beneficial to provide either or both of the mapping cache 110 and the volatile mapping data structure 120 on a relatively faster machine-readable medium than the non-volatile mapping data structure 160 of FIG. 1A.

The real time clock unit 132 may include time keeping logic or a mechanism to send a request for a real-world time value and to receive a response to the request.

The log writer unit 140 may include at least logic which recognizes when the log writer unit 140 transitions to a particular state and, when the log writer unit 140 transitions to the particular state, writing an LTV-to-RTV mapping to the volatile mapping data structure 120. The system monitoring unit 150 may include logic that recognizes when the system monitoring unit 150 transitions to a particular state and, when the system monitoring unit 150 transitions to the particular state, writes one or more entries to the non-volatile mapping data structure 160 based on the volatile mapping data structure 120.

Logical and Real Time Values

Logical and real time values may indicate two important, but different, aspects of a database system. Databases are event-driven, and some databases are built such that the database keeps records of all changes made to it. The sequence number assigned to these events is termed herein as a "logical time value" (an LTV). The events to which an LTV is assigned may include any event that modifies the database, e.g. committed database writes. Other events related to the database may not be assigned LTVs, e.g. database reads. Any appropriate scheme for determining a logical time value may be used with the techniques described herein, including an LTV implemented as an integer count of the number of events. In one embodiment, each LTV may be associated with multiple events. In a multinode system, where one or more of the "nodes" are database servers 180A, 180B, and 180C, all of the database servers 180A, 180B, and 180C may obtain LTVs from a single logical clock unit 131.

A real time value refers to a time value associated with real world time at a particular physical location, usually the physical location of the system in question or the physical location of a user of the system. Each occurrence an event in the database may be associated with an LTV and an RTV. In one embodiment, the LTV and RTV of a database system increase together, with the RTV increasing continuously (with time) and the LTV increasing continually (as events occur in the database). Therefore, as events occur in the database, each subsequent LTV may be mapped to a higher RTV.

Example Data Structures

Any of the volatile mapping data structure 120, the mapping cache 110, and non-volatile mapping data structure 160 discussed herein may take any appropriate form. For example, a volatile mapping data structure 120 may include a first mapping table 200 (described below), a maximum table length, and a "wrap-around" pointer to indicate where the next LTV-to-RTV mapping entry in the first mapping table 200 should be placed. In a limited-length first mapping table 200, the wrap-around pointer may be beneficial since, if more than the maximum number of entries are written to the volatile mapping data structures 120, then for each new entry added to the volatile mapping data structure 120, the use of the wrap-around pointer will enable the oldest entry in the first mapping table 200 to be overwritten. The same example data structures may also be used for the mapping cache 110. A non-volatile mapping data structure 160 may include any appropriate table including the data structure described for the volatile mapping data structure 120, or the tables 200 or 240 as described in FIG. 2A and FIG. 2B. For example, in the context of FIG. 1A and FIG. 1B, the mapping cache 110 includes a first mapping table 200, the volatile mapping data structure 120 includes a first mapping table 200, and the non-volatile mapping data structure 160 includes a second mapping table 240.

In one embodiment, the volatile mapping data structure 120 is stored in a volatile memory and the non-volatile mapping data structure 160 is stored on disk. Alternatively, both the volatile mapping data structure 120 and the non-volatile mapping data structure 160 may be stored on disk or in memory. In a related embodiment where the volatile mapping data structure 120 and the non-volatile mapping data structure 160 are both stored in memory, the volatile mapping data structure 120 may be stored in a faster memory than the non-volatile mapping data structure 160.

FIG. 2A is an illustration of a first mapping table 200 for storing LTV-to-RTV mappings.

The first mapping table 200 comprises two columns: a logical time value column 210 and a real time value column 220. In general, the entries in the first mapping table 200 may include one or more logical time values in the logical time value column 210 and corresponding real time values in the real time value column 220. For example, in the context of FIG. 1A and FIG. 1B, a volatile mapping data structure 120 includes a first mapping table 200, and the first mapping table 200 includes logical time values and corresponding real time values in the logical time value column 210 and the real time value column 220, respectively.

FIG. 2B is an illustration of a second mapping table 240 for storing LTV-to-RTV mappings.

The second mapping table 240 includes a starting logical time value column 242, a starting real time value column 244, an ending logical time value column 246, an ending real time value column 248, a length column 250, and a data column 252. Each entry in each of columns 242-252 has a corresponding entry in each of the other columns 242-252. Each entry in the data column 252 holds data in a defined format that corresponds to multiple LTV-to-RTV mappings. The multiple LTV-to-RTV mappings will generally comprise LTV-to-RTV mappings that are within a defined range of logical time (LTVs) and real time (RTVs). The entries in the corresponding columns reference the range of LTV-to-RTV stored in the range of mappings in the data column. Entries in the starting LTV column 242 and starting RTV column 244 represent the "earliest" logical and real time values, respectively, in the range of LTV-to-RTV mappings in the corresponding entry in the data column 252. Entries in the ending LTV column 246 and ending RTV column 248 represent the "latest" logical and real time values, respectively, in the range of LTV-to-RTV mappings in the corresponding entry in the data column 252. The entry in the length column 250 represents the number of mappings stored in the corresponding entry of the data column 252.

Functional Overview

Figure 3:
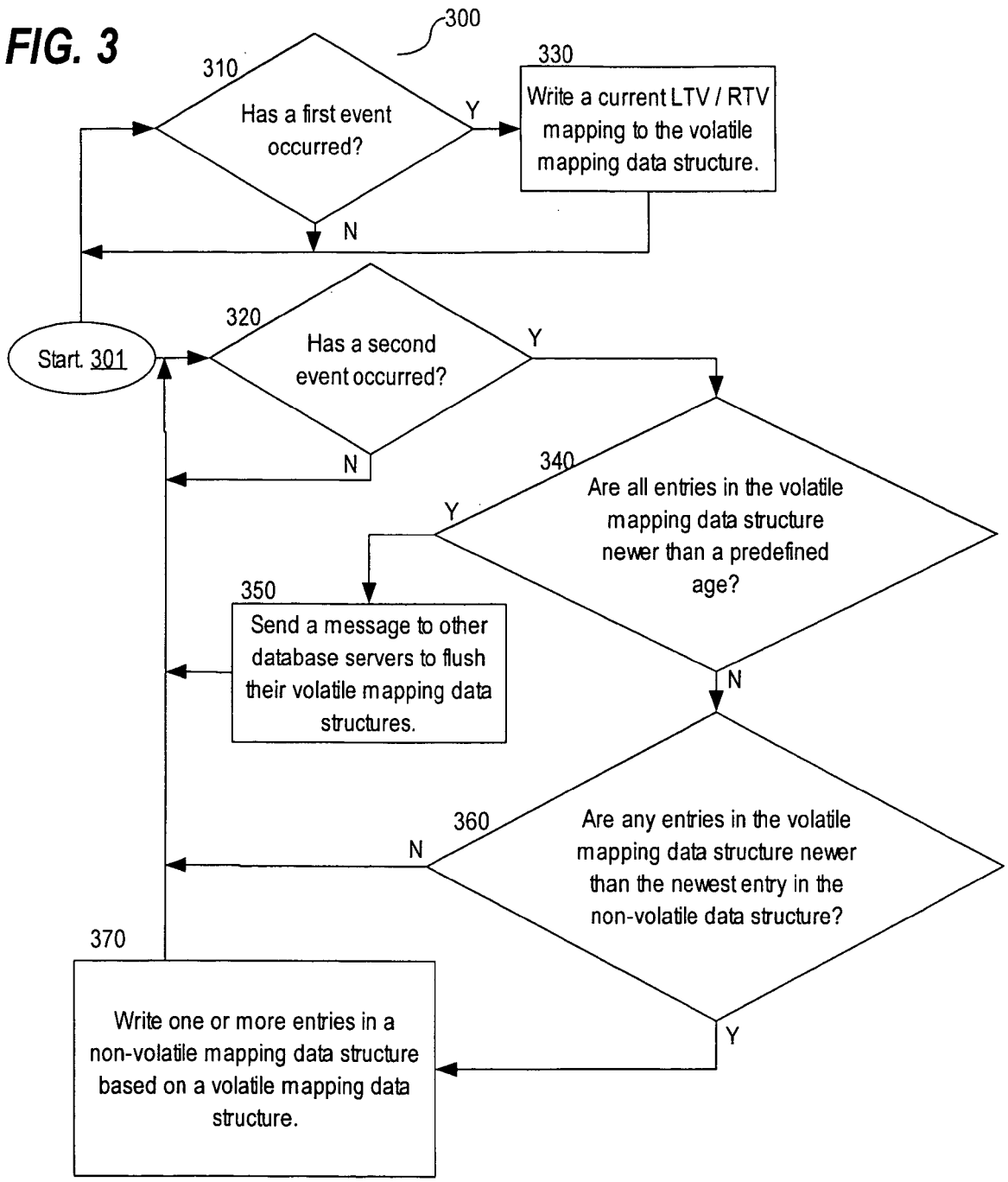
FIG. 3 is a flow diagram depicting a process for updating LTV-to-RTV mappings.

FIG. 3 is a flow diagram depicting a process for updating LTV-to-RTV mappings.

In step 301, the process for updating LTV-to-RTV mappings begins. The process may start by starting one or more processes that determine whether certain events occur. Alternatively, the process may start by executing one or more operating system commands on one or more systems that will cause the certain events to occur. For example, in the context of FIG. 1A and FIG. 1B, two clock daemon operating system commands, "cron jobs", are executed on a database server 180A, or a process communicatively coupled thereto, in order to cause a log writer unit 140 to execute or "wake up" once every three seconds (corresponding to the occurrence of a "first event") and cause a system monitoring unit 150 to wake up once every five minutes (corresponding to the occurrence of a "second event").

In step 310, a check is performed at the database server 180A to determine whether a first event has occurred. The first event may occur when a certain number of records have been written to the database, when a particular period of time passes, or when a certain process transitions to a particular state. For example, in the context of FIG. 1B, determining that a first event has occurred may include determining that three seconds (or any particular amount of time) has passed since the most current prior performance of step 330; and the first event may include a cron job causing the execution of code that "wakes up" or initiates a log writer unit 140.

If the first event has occurred, then in step 330, a current LTV-to-RTV mapping is written to a volatile mapping data structure 120. In order to determine the current LTV and RTV, and thereby a current LTV-to-RTV mapping, it may be necessary to access a logical clock unit 131, a real time clock unit 132, or other mechanism for indicating the appropriate logical and real time values. Once current LTV and RTV are determined, an LTV-to-RTV mapping is written to the volatile mapping data structure 120. For example, in the context of FIG. 1A, FIG. 1B, and FIG. 2A, a logical clock unit 131 and a real time clock unit 132 are accessed to determine the current LTV and RTV, respectively. Then the LTV and RTV are written to the LTV column 210 and RTV column 220 of the first mapping table 200, which is part of the volatile mapping data structure 120.

If the first event has not occurred, as determined in step 310, or once the current LTV-to-RTV mapping has been written to the volatile mapping data structure (step 330), then a check is again performed to determine whether the first event has occurred, step 310. In one embodiment, checks are continually performed to determine whether the first event has occurred as part of step 310.

In step 320, a check is performed at the database server 180A to determine whether a second event has occurred. The second event may occur when a certain number of records have been written to the database 130, when a particular period of time passes since the most recent prior performance of step 340, when the volatile mapping data structure 120 has a particular number of entries, or when a certain process transitions to a particular state. For example, determining that a second event has occurred may include determining that five minutes (or any particular amount of time) has passed since the last occurrence of the second event; and the second event may be caused by a cron job causing the execution of a system monitoring unit 150.

If the second event has occurred, then in step 340, a check is performed to determine whether all of the entries in the volatile mapping data structure 120 are newer than a predefined age. In other embodiments, step 340 may include determining whether there are more than a predefined number of entries in the volatile mapping data structure 120.

If all of the mappings in the volatile mapping data structure 120 are newer than a predefined age (as determined in step 340), then in step 350, the database server 180A sends a message to the other database servers 180B and 180C. The message may indicate that the other database servers 180B and 180C should flush their volatile mapping data structure 120 to the non-volatile mapping data structure 160. The message may also cause the occurrence of a second event at the other database servers 180B and 180C. After the messages are sent to the other database servers 180B and 180C, step 320 is performed.

If all of the mappings in the volatile mapping data structure 120 are not newer than a predefined age (as determined in step 340), then in step 360, a check is performed to determine whether any of the entries in the volatile mapping data structure 120 are newer than all of the entries in the non-volatile mapping data structure 160. Determining whether the entries in the volatile mapping data structure 120 are newer than the entries in the non-volatile mapping data structure 160 may include accessing the non-volatile mapping data structure 160 to determine the LTV and/or RTV values are for the newest LTV-to-RTV mapping in the non-volatile mapping data structure 160. Determining whether any of the mappings in the volatile mapping data structure 120 are newer than the mapping entries in the non-volatile mapping data structure 160 may include any of (1) determining whether any of the LTV values in the LTV-to-RTV mappings in the volatile mapping data structure 120 are newer than the newest LTV value in the non-volatile mapping data structure 160; (2) determining whether any of the RTV values in the LTV-to-RTV mappings in the volatile mapping data structure 120 are newer than the newest RTV value in the non-volatile mapping data structure 160; or (3) determining whether any of the LTV-to-RTV mappings in the volatile mapping data structure 120 have (a) LTV values that are newer than the newest LTV value in the non-volatile mapping data structure 160 and (b) RTV values that are newer than the newest RTV value in the non-volatile mapping data structure 160.

If none of the LTV-to-RTV mappings in the volatile mapping data structure 120 are newer than the LTV-to-RTV mappings in the non-volatile mapping data structure 160, then step 320 is performed. In one embodiment, if none of the mappings in the volatile mapping data structure 120 are newer than the mappings in the non-volatile mapping data structure, then all of the entries in the volatile mapping data structure are deleted.

If there are LTV-to-RTV mappings in the volatile mapping data structure 120 that are newer than the mappings in the non-volatile mapping data structure 160 (referred to hereafter as the "newer LTV-to-RTV mappings"), then in step 370, one or more entries are written to the non-volatile mapping data structure 160 based on the newer LTV-to-RTV mappings. In one embodiment, after writing the one or more entries to the non-volatile mapping data structure 160 based on the newer LTV-to-RTV mappings, the volatile mapping data structure 120 is emptied or otherwise reset. In one embodiment, one entry is written to the non-volatile mapping data structure 160 for each mapping in the newer LTV-to-RTV mappings. Alternatively, a single entry is added to the non-volatile mapping data structure 160 based on the newer LTV-to-RTV mappings. For example, in the context of FIG. 1A, FIG. 1B, and FIG. 2B, the second event has occurred, which has caused the execution of the system monitoring unit 150. The system monitoring unit 150 determines the set of "newer LTV-to-RTV mappings" and determines the earliest and latest RTVs and LTVs as well as the number of entries in the set of newer LTV-to-RTV mappings. The system monitoring unit 150 then writes the earliest LTV, earliest RTV, latest LTV, latest RTV, and number of entries to columns 242, 244, 246, 248, and 250 of the second mapping table 240 which is part of the non-volatile mapping data structure 160. The system monitoring unit 150 also writes the set of newer LTV-to-RTV mappings as a single data block to the entry in the data column 252 corresponding to the entries previously written in columns 242-250. After step 370 is performed, step 320 is performed. In one embodiment, checks are continually performed, as part of step 320, to determine whether the second event has occurred.

Various embodiments of techniques described with respect to FIG. 3 provide continual updating of the volatile mapping data structure 120 and non-volatile mapping data structure 160 in a multinode system based on appropriate system and database events. Depending on implementation and desired results, it may be beneficial to use an embodiment in which the first event occurs more often than the second event and to provide the volatile mapping data structure 120 in a faster memory, e.g. in volatile memory, and to provide the non-volatile mapping data structure in a relatively slower memory, e.g. in a non-volatile memory. One benefit derived from such an embodiment is a reduction in the burden on the system of recording the LTV-to-RTV mappings.

In the embodiments described above, particular logical machines were depicted as performing particular steps. The techniques described herein are in no way limited to such embodiments.

In the embodiments described above, particular steps and particular order of steps were described with respect to FIG. 3. The techniques described herein are in no way limited to these particular steps or the particular order of steps presented. For example, in one embodiment, steps 340 and 350 may not be implemented and step 360 would be performed after the occurrence of the second event (step 320).

Different choices of events for the first event and second event each have potential benefits. One potential benefit of an embodiment in which the first event occurs each time a change is made to the database is that each LTV will have an LTV-to-RTV mapping recorded in the volatile mapping data structure. On the other hand, a potential benefit of having the first event occur with a particular frequency is that it enables a fixed temporal granularity of LTV-to-RTV mappings. One potential benefit of having each of the first or second events occur when a particular processes transition to particular states may be ease of implementation and the transitions may happen at a particular frequency or when a change is made to the database, thereby incorporating other event types. A potential benefit of having the second event occur each time a particular number of entries have been added to the volatile mapping data structure since the last occurrence of the second event may be ensuring that the second event occurs as infrequently as possible while still ensuring that the second mapping includes all of the mappings that had been recorded to the volatile mapping data structure; this may be beneficial when there is a fixed maximum number of entries allowable in the volatile mapping data structure. It may be beneficial to set the maximum number of entries in the volatile mapping data structure to ensure that the second event will occur (and the entries of the volatile mapping data structure written to the non-volatile mapping data structure) before the volatile mapping data structure reaches the maximum number of entries. For example, in the context of FIG. 1A and FIG. 1B, if a second event occurs once every three hundred seconds and the first event occurs once every three seconds, then having the maximum number of entries for the volatile mapping data structure 120 set to a number greater than one hundred would ensure that the volatile mapping data structure 120 will not reach its maximum capacity before an occurrence of the second event. This may be beneficial as it may allow all of the entries in the volatile mapping data structure 120 that are newer than the entries in the non-volatile mapping data structure 160 to be written to the non-volatile mapping data structure 160.

Figure 4:
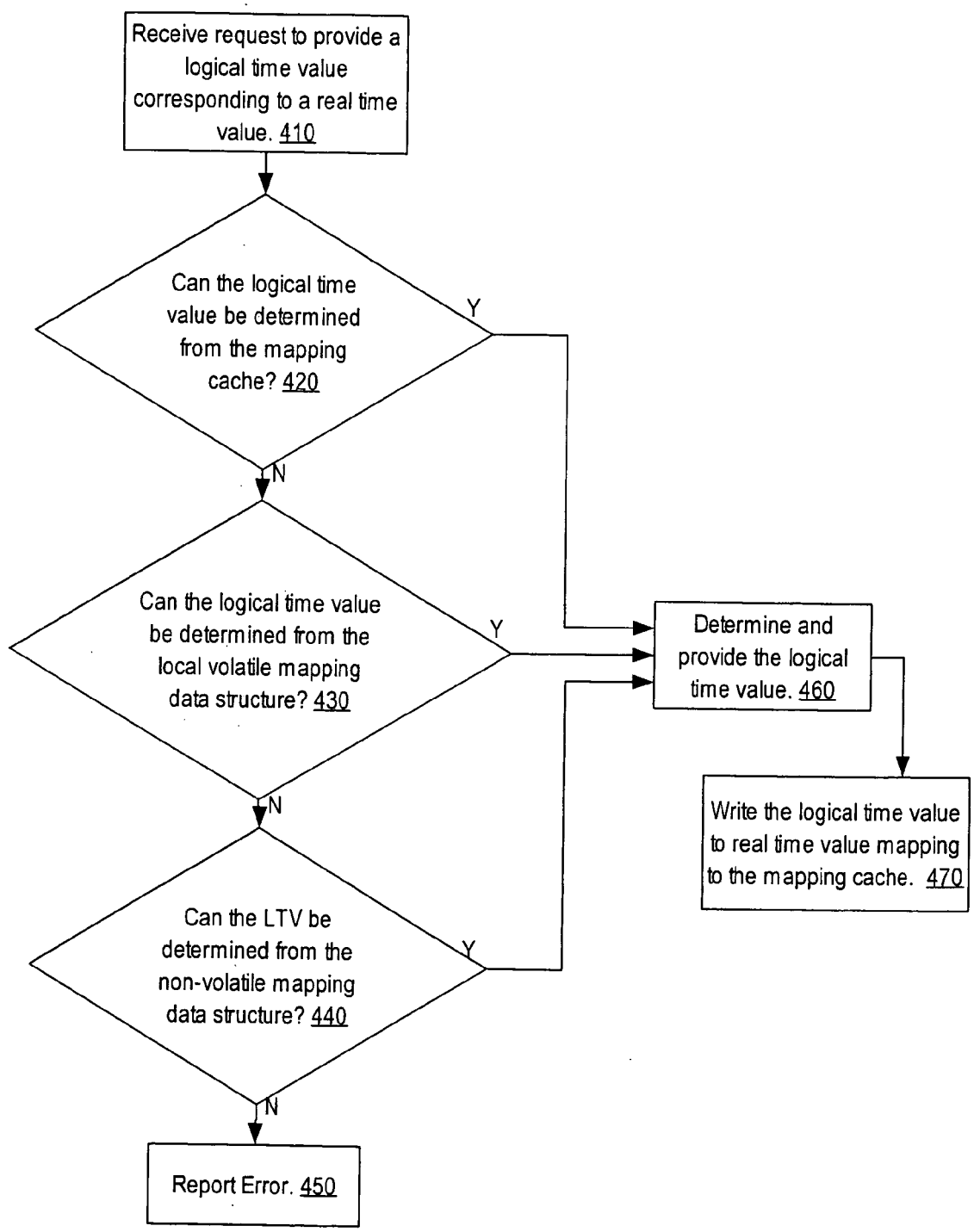
FIG. 4 is a flow diagram depicting a process for providing mappings between logical time values and real time values in a multinode system.

FIG. 4 is a flow diagram depicting a process for providing mappings between logical time values and real time values.

In step 410 a request to provide an LTV corresponding to an RTV is received. The request may be received from any appropriate party, including an outside process or a process within a database server. Any appropriate unit or process may receive the request. For example, in the context of FIG. 1A, a database server 180A receives a query from a database application requesting results "as of" a particular RTV. The database server 180A then must determine an LTV-to-RTV mapping.

In one embodiment, in step 420, a check is performed to establish whether the LTV can be determined from the mapping cache 110. In other embodiments, no mapping cache 110 is included, no check of a mapping cache 110 is performed, step 420 is not performed, and step 430 is performed after step 410. The check of the mapping cache 110, if performed, may include determining whether an RTV included in the cache is "close enough" to the RTV in question. An RTV in the mapping cache 110, or even in the volatile mapping data structure 120 or non-volatile mapping data structure 160, may be considered "close enough" if it is within a predefined period of time of an RTV in the cache or data structure. In other embodiments, the RTV will be considered close enough if it is within a predetermined period of time after an RTV in the cache 110 or data structure 120 or 160. For example, in the context of FIG. 1A and FIG. 1B, an RTV is considered close enough to an RTV in the mapping cache 110 if it is within the three seconds after the RTV in the mapping cache 110.

If an LTV corresponding to the particular RTV cannot be determined from the mapping cache 110 in step 420, then in step 430, a check is performed to establish whether an LTV can be determined from the volatile mapping data structure 120. Establishing whether an LTV can be determined from the volatile mapping data structure 120 may include determining whether the particular RTV is close enough to an RTV in the volatile mapping data structure 120, determining whether the RTV is within the range of RTVs included in the volatile mapping data structure 120, or any other appropriate check. For example, in the context of FIG. 1A and FIG. 1B, a user proxy unit 105 performs a check to establish whether an LTV can be determined for an RTV by first checking the maximum allowable age of an RTV in the volatile mapping data structure 120, which in this example is five minutes. If the RTV is more than five minutes old, the RTV could not be defined by information in the volatile mapping data structure 120. If the RTV is less than five minutes old, then the range of RTVs values known to be in the volatile mapping data structure 120 is checked. If the particular RTV is within the range of RTVs values in the range of RTVs values in the volatile mapping data structure 120, then an RTV to LTV mapping is determined from the volatile mapping data structure 120.

If an LTV corresponding to the particular RTV cannot be determined from the volatile mapping data structure 120 in step 430, then in step 440, a check is performed to establish whether an LTV can be determined from the non-volatile mapping data structure 160. Establishing whether an LTV can be determined from the non-volatile mapping data structure 160 may include determining whether the particular RTV is close enough to an RTV in the non-volatile mapping data structure 160, determining whether the RTV is within the range of RTVs included in the non-volatile mapping data structure 160, or any other appropriate check. For example, in the context of FIG. 1A and FIG. 1B, a user proxy unit 105 performs a check to establish whether an LTV can be determined for an RTV by first checking the maximum allowable age, as defined by the user configuration 106, of an RTV in the non-volatile mapping data structure 160, which in this example is three months. If the RTV is older than the maximum allowable age for an RTV in the non-volatile mapping data structure 160, then an error is reported in step 450. If the RTV is within the allowable ages for the non-volatile mapping data structure 160, then a check is performed to establish whether the particular RTV is within the range of RTVs known to be in the non-volatile mapping data structure 160. If the RTV is within the range of RTVs known to be within the non-volatile mapping data structure 160, then step 460 is performed.

If an LTV for the particular RTV can be determined from the mapping cache 110 (step 420), the volatile mapping data structure 120 (step 430), or the non-volatile mapping data structure 160 (step 440), then in step 460, the LTV is determined and the logical time value is provided to the requestor. The method of determining the LTV for the RTV will vary depending on the type of data structure employed by whichever of the mapping cache 110, volatile mapping data structure 120, or non-volatile mapping data structure 160 has been established as being able to provide the LTV. If the type of data structure is a table of LTV-to-RTV mappings, then determining the LTV may include determining 1) whether the particular RTV is close enough to an entry in the data structure or cache, or 2) which entry in the data structure or cache best approximates the particular RTV. The concept of an RTV entry being close enough to the particular RTV is described above. Determining which entry in the data structure 120 or 160 or cache 110 best approximates the particular RTV may include establishing as the mapping RTV either the RTV in the table is the closest in absolute time to the particular RTV or the RTV in the table is the closest in time among the RTVs that occurred before (or in another embodiment, after) the particular RTV. Once the mapping RTV has been established, then the LTV corresponding to the RTV is established as the mapped LTV. The mapped LTV is sent to the requestor and the mapping RTV/mapped LTV mapping is written to the mapping cache 110 in step 470.

If the LTV for the particular RTV cannot be determined from the mapping cache 110, volatile mapping data structure 120, or non-volatile mapping data structure 160, then an error is reported in step 450. Reporting an error may involve any appropriate action, including sending a reply to the requestor indicating the failure, writing a record of the failure to a log file or database, or sending a message to an administrator of the database server 180A.

Various embodiments described with respect to FIG. 4 enable the efficient determination of LTV-to-RTV mappings. The use of multiple data structures and caches enables the efficient storage (as described with respect to FIG. 3) and efficient retrieval (as described with respect to FIG. 4) of LTV-to-RTV mappings. The query processing of FIG. 5 further enables the use of the LTV-to-RTV mappings to enable queries to be executed "as of" a particular real time.

Figure 5:
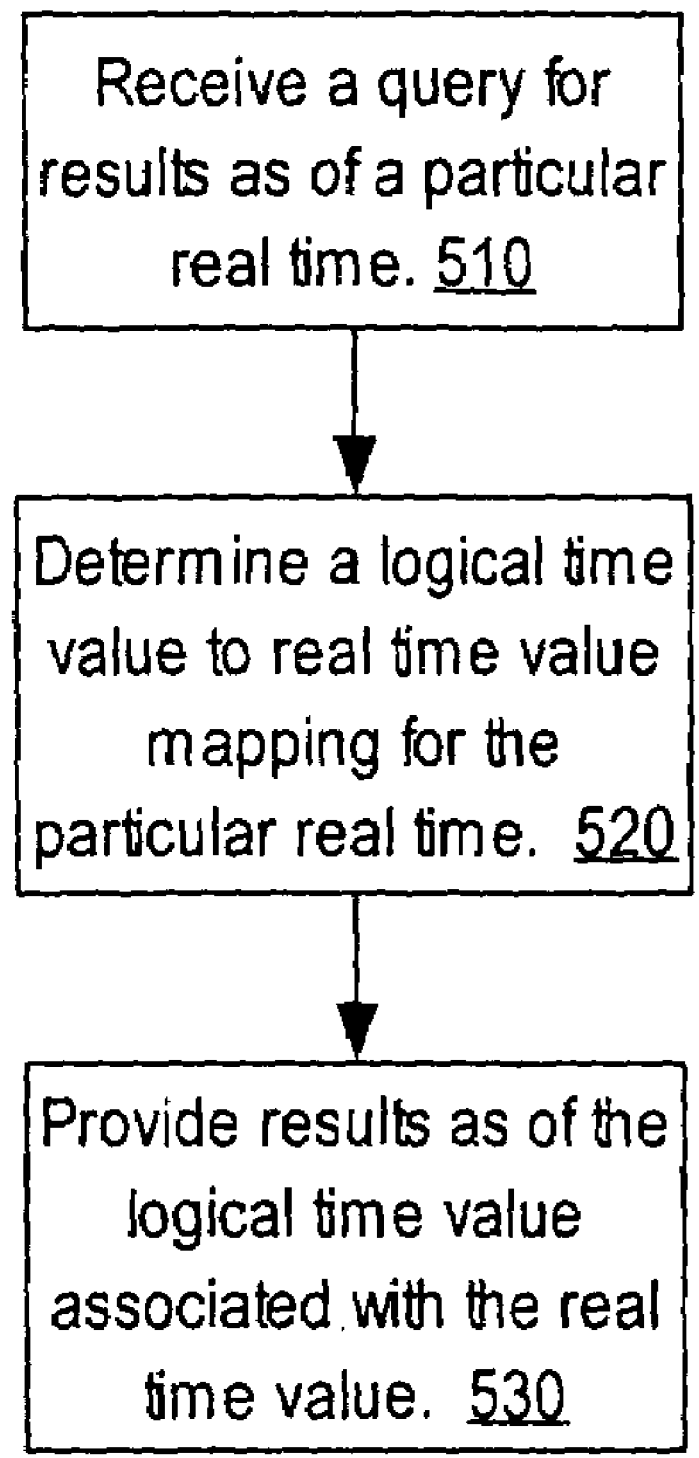
FIG. 5 is a flow diagram depicting a process for responding to a query as of a particular real time.

FIG. 5 is a flow diagram depicting a process for responding to a query as of a particular real time.

In step 510, a query is received that request results as of a particular real time. The query may be received by a database server or a process communicatively coupled thereto. The query may be received from an outside process, may be typed into a command line interface, or may be received via any appropriate mechanism. For example, in the context of FIG. 1A and FIG. 1B, a database server 180A received a query for results as of a particular real time from an outside process via a user proxy unit 105. The query may be in any query language supported by or interpretable by the receiving database server, including Structured Query Language (SQL).

In step 520, an LTV-to-RTV mapping is determined for the particular real time. Various embodiments of determining an LTV-to-RTV are discussed below with respect to FIG. 4 and in other sections herein. For example, in the context of FIG. 1A and FIG. 1B, a user proxy unit 105 determines an LTV-to-RTV mapping for the particular real time using the process described with respect to FIG. 4.

In step 530, results are provided as of the LTV indicated by the LTV-to-RTV mapping determined in step 520. Providing results as of a particular time may include effectively backing out all changes made to the database since the LTV indicated by the LTV-to-RTV mapping while executing the "as of" query. Various embodiments of providing results as of a particular time are described in '211.

Various embodiments described in FIG. 5 provide a mechanism for providing results as of a particular real time.

Hardware Overview

Figure 6:
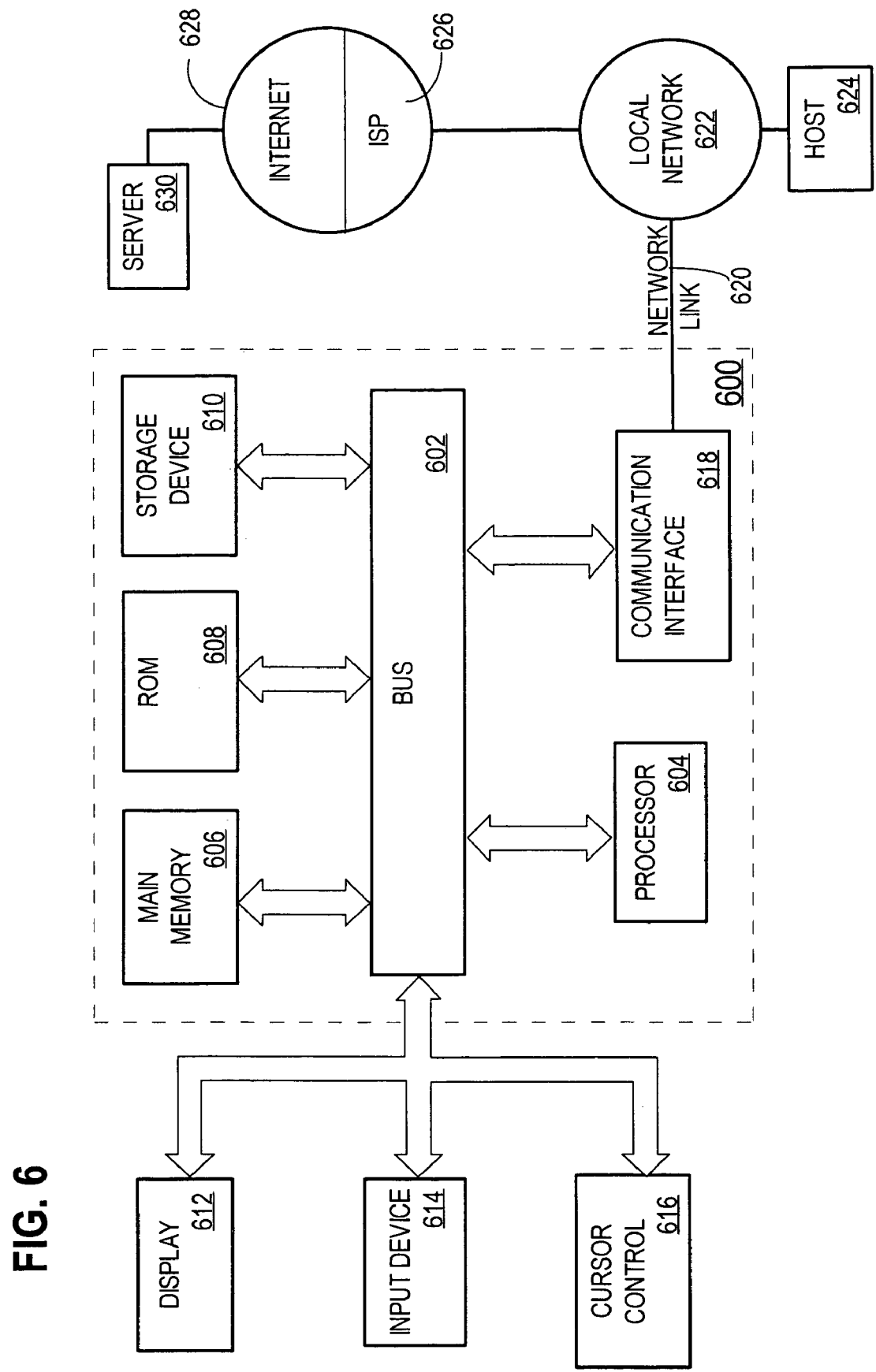
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610.

Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of determining an logical time value to real time value (LTV-to-RTV) mapping in a system, comprising the steps of:

if a first event occurs, then writing a first logical time value to real time value (LTV-to-RTV) mapping to a first mapping data structure;

if a second event occurs, then:

determining whether a first set of conditions are satisfied, wherein determining whether the first set of conditions is satisfied comprises determining whether there are one or more logical time value to real time value LTV-to-RTV mappings in the first mapping data structure that are newer than all logical time value to real time value (LTV-to-RTV) mappings in a second mapping data structure;

if the first set of conditions are satisfied, then:

writing one or more logical time value to real time value (LTV-to-RTV) mappings to the second mapping data structure based on those logical time value to real time value (LTV-to-RTV) mappings in the first mapping data structure that are newer than all logical time value to real time value (LTV-to-RTV) mappings in the second mapping data structure; and determining, and storing in a computer-readable storage medium, a logical time value (LTV) for a particular real time value (RTV), based on the particular real time value (RTV) and information in a source of a set of sources, wherein the set of sources comprises the first mapping data structure and the second mapping data structure.

2. The method of claim 1, wherein a given LTV-to-RTV mapping in the first mapping data structure is considered newer than all LTV-to-RTV mappings in the second mapping data structure if a given RTV corresponding to the given LTV-to-RTV mapping is newer than all RTV values in all LTV-to-RTV mappings in the second mapping data structure and a given LTV corresponding to the given LTV-to-RTV mapping is newer than all LTV values in all LTV-to-RTV mappings in the second mapping data structure.

3. The method of claim 1, wherein a given LTV-to-RTV mapping in the first mapping data structure is considered newer than all LTV-to-RTV mappings in the second mapping data structure if a given LTV corresponding to the given LTV-to-RTV mapping is newer than all LTV values in all LTV-to-RTV mappings in the second mapping data structure.

4. The method of claim 1, wherein a given LTV-to-RTV mapping in the first mapping data structure is considered newer than all LTV-to-RTV mappings in the second mapping data structure if a given RTV corresponding to the given LTV-to-RTV mapping is newer than all RTVs values in all LTV-to-RTV mappings in the second mapping data structure.

5. The method of claim 1, wherein the system is a multinode system comprising a first node and a second node, and wherein the first node comprises a first real time clock unit, the second node comprises a second real time clock unit, the first node stores LTV-to-RTV mappings generated based on the first real time clock unit in the first mapping data structure, and wherein and the second node stores LTV-to-RTV mappings generated based on the second real time clock unit in a third data structure, and wherein the first real time clock unit and second real time clock unit are separate and distinct.

6. The method of claim 1, where the second event occurs when a request to write to the second mapping data structure is received.

7. The method of claim 1, wherein the second event occurs when a particular process transitions to a particular state.

8. The method of claim 1, wherein determining whether the first set of conditions are satisfied comprises determining whether the LTV-to-RTV mappings in the first mapping data structure span a predefined amount of time.

9. The method of claim 8, further comprising the step of, if the LTV-to-RTV mappings in the first mapping data structure do not span said predefined amount of time, then sending a message to a process, which message indicates that the process should write one or more LTV-to-RTV mappings to the second mapping data structure.

10. The method of claim 9, wherein said process is a process associated with a second node in a multinode system, and wherein said message indicates that the second node should write one or more LTV-to-RTV mappings to the second mapping data structure.

11. The method of claim 1, wherein the step of determining the LTV comprises:
performing a first check to determine whether the LTV that is mapped to the particular RTV can be determined from the first mapping data structure;
if the LTV that is mapped to the particular RTV can be determined from the information in first mapping data structure, then determining the LTV that is mapped to the particular RTV;
if the LTV that is mapped to the particular RTV cannot be determined from the first mapping data structure, then performing a second check to determine whether the LTV that is mapped to the particular RTV can be determined from information in the second mapping data structure;
if the LTV that is mapped to the particular RTV can be determined from the information in second mapping data structure, then determining the LTV that is mapped to the particular RTV.

12. The method of claim 1, wherein the method further comprises the step of:
if there are no records in the first mapping data structure that are newer than all records in the second mapping data structure, removing all records from the first mapping data structure.

13. The method of claim 1, wherein the set of sources further comprises a cache of LTV-to-RTV mappings and the method further comprises the step of, if the LTV that is mapped to the particular RTV can be determined from the cache, determining the LTV based on the particular RTV and the cache.

14. The method of claim 1, further comprising the step of populating a cache of LTV-to-RTV mappings by writing the LTV that is mapped to the particular RTV and the particular RTV to the cache of LTV-to-RTV mappings.

15. The method of claim 1, wherein the first mapping data structure is stored in a relatively faster machine-readable medium and the second mapping data structure is stored in a relatively slower machine-readable medium.

16. The method of claim 15, wherein the relatively faster machine-readable medium is a volatile memory and the relatively slower machine-readable medium is a non-volatile memory.

17. The method of claim 1, wherein a maximum age of RTV in the second mapping data structure is defined by a user-specified configuration value.

18. The method of claim 1, wherein the first event is a first recurring event and the second event is a second recurring event, and the first recurring event occurs more often than the second recurring event.

19. The method of claim 18, wherein the first recurring event occurs when a log writer unit transitions to a certain state.

20. The method of claim 18, wherein the second recurring event occurs when a system monitoring unit transitions to a certain state.

21. The method of claim 1, wherein the first event occurs when a record is written to a database.

22. The method of claim 1, further comprising the step of maintaining the first mapping data structure such that the first mapping data structure contains the LTV-to-RTV mappings for the most recent RTV values.

23. The method of claim 1, wherein the method further comprises the steps of:
receiving a query requesting information as of the particular RTV;
providing, as results of the query, only information that is associated with commit LTVs that are not more recent than the LTV that is mapped to the particular RTV.

24. The method of claim 11, wherein the step of performing the first check to determine whether the LTV that is mapped to the particular RTV can be determined from the first mapping data structure comprises:
determining a range of RTVs values in the first mapping data structure; and
determining whether the particular RTV falls in the range of RTVs values.

25. The method of claim 11, wherein the step of performing the second check to determine whether the LTV that is mapped to the particular RTV can be determined from the second mapping data structure comprises:
  determine a range of RTVs values in the second mapping data structure; and
  determining whether the particular RTV falls in the range of RTVs values.

26. The method of claim 11, wherein the second mapping data structure comprises one or more columns that indicate ranges of RTV values and a particular column containing information related to the LTV-to-RTV mappings for the ranges of RTV values; and the step of performing the second check to determine whether the LTV that is mapped to the particular RTV can be determined from the second mapping data structure comprises performing a particular check to determine whether the particular RTV falls within any of the ranges of RTV values.

27. The method of claim 1, further comprising the step of, if the LTV that is mapped to the particular RTV cannot be determined from the first mapping data structure and the LTV that is mapped to the particular RTV cannot be determined from any said source, then reporting an error.

28. The method of claim 27, wherein reporting the error comprises sending a message to one or more of a database administrator, a system administrator, and a sender of a request for the LTV that corresponds to the particular RTV.

29. The method of claim 1, wherein the second event occurs when there are a predefined number of new entries in the first mapping data structure since a previous occurrence of the second event.

30. The method of claim 1, wherein the step of writing one or more entries in the second mapping data structure comprises writing a single entry that contains information corresponding to all entries in the first mapping data structure.

31. A computer-readable storage medium carrying one or more sequences of instructions which, when executed by one or more processors, causes the one or more processors to perform the method recited in claim 1.

32. A computer-readable storage medium carrying one or more sequences of instructions which, when executed by one or more processors, causes the one or more processors to perform the method recited in claim 2.

33. A computer-readable storage medium carrying one or more sequences of instructions which, when executed by one or more processors, causes the one or more processors to perform the method recited in claim 3.

34. A computer-readable storage medium carrying one or more sequences of instructions which, when executed by one or more processors, causes the one or more processors to perform the method recited in claim 4.

35. A computer-readable storage medium carrying one or more sequences of instructions which, when executed by one or more processors, causes the one or more processors to perform the method recited in claim 5.

36. A computer-readable storage medium carrying one or more sequences of instructions which, when executed by one or more processors, causes the one or more processors to perform the method recited in claim 6.

37. A computer-readable storage medium carrying one or more sequences of instructions which, when executed by one or more processors, causes the one or more processors to perform the method recited in claim 7.

38. A computer-readable storage medium carrying one or more sequences of instructions which, when executed by one or more processors, causes the one or more processors to perform the method recited in claim 8.

39. A computer-readable storage medium carrying one or more sequences of instructions which, when executed by one or more processors, causes the one or more processors to perform the method recited in claim 9.

40. A computer-readable storage medium carrying one or more sequences of instructions which, when executed by one or more processors, causes the one or more processors to perform the method recited in claim 10.

41. A computer-readable storage medium carrying one or more sequences of instructions which, when executed by one or more processors, causes the one or more processors to perform the method recited in claim 11.

42. A computer-readable storage medium carrying one or more sequences of instructions which, when executed by one or more processors, causes the one or more processors to perform the method recited in claim 12.

43. A computer-readable storage medium carrying one or more sequences of instructions which, when executed by one or more processors, causes the one or more processors to perform the method recited in claim 13.

44. A computer-readable storage medium carrying one or more sequences of instructions which, when executed by one or more processors, causes the one or more processors to perform the method recited in claim 14.

45. A computer-readable storage medium carrying one or more sequences of instructions which, when executed by one or more processors, causes the one or more processors to perform the method recited in claim 15.

46. A computer-readable storage medium carrying one or more sequences of instructions which, when executed by one or more processors, causes the one or more processors to perform the method recited in claim 16.

47. A computer-readable storage medium carrying one or more sequences of instructions which, when executed by one or more processors, causes the one or more processors to perform the method recited in claim 17.

48. A computer-readable storage medium carrying one or more sequences of instructions which, when executed by one or more processors, causes the one or more processors to perform the method recited in claim 18.

49. A computer-readable storage medium carrying one or more sequences of instructions which, when executed by one or more processors, causes the one or more processors to perform the method recited in claim 19.

50. A computer-readable storage medium carrying one or more sequences of instructions which, when executed by one or more processors, causes the one or more processors to perform the method recited in claim 20.

51. A computer-readable storage medium carrying one or more sequences of instructions which, when executed by one or more processors, causes the one or more processors to perform the method recited in claim 21.

52. A computer-readable storage medium carrying one or more sequences of instructions which, when executed by one or more processors, causes the one or more processors to perform the method recited in claim 22.

53. A computer-readable storage medium carrying one or more sequences of instructions which, when executed by one or more processors, causes the one or more processors to perform the method recited in claim 23.

54. A computer-readable storage medium carrying one or more sequences of instructions which, when executed by one or more processors, causes the one or more processors to perform the method recited in claim 24.

55. A computer-readable storage medium carrying one or more sequences of instructions which, when executed by one or more processors, causes the one or more processors to perform the method recited in claim 25.

56. A computer-readable storage medium carrying one or more sequences of instructions which, when executed by one or more processors, causes the one or more processors to perform the method recited in claim 26.

57. A computer-readable storage medium carrying one or more sequences of instructions which, when executed by one or more processors, causes the one or more processors to perform the method recited in claim 27.

58. A computer-readable storage medium carrying one or more sequences of instructions which, when executed by one or more processors, causes the one or more processors to perform the method recited in claim 28.

59. A computer-readable storage medium carrying one or more sequences of instructions which, when executed by one or more processors, causes the one or more processors to perform the method recited in claim 29.

60. A computer-readable storage medium carrying one or more sequences of instructions which, when executed by one or more processors, causes the one or more processors to perform the method recited in claim 30.

* * * * *